Aug. 22, 1950 — A. E. HANSEN — 2,519,460
BUTT-RIGGING SWIVEL
Filed Nov. 22, 1948
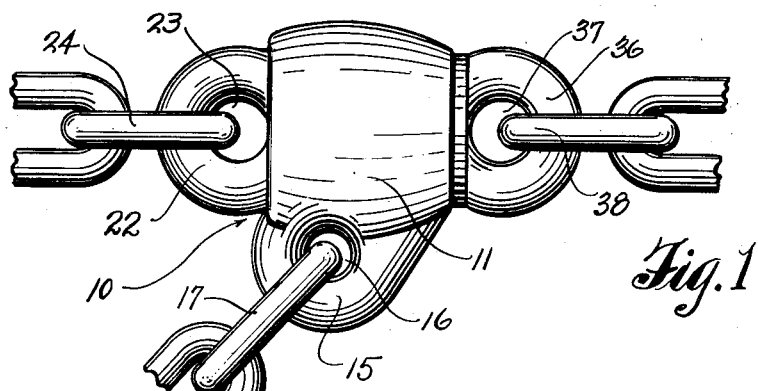
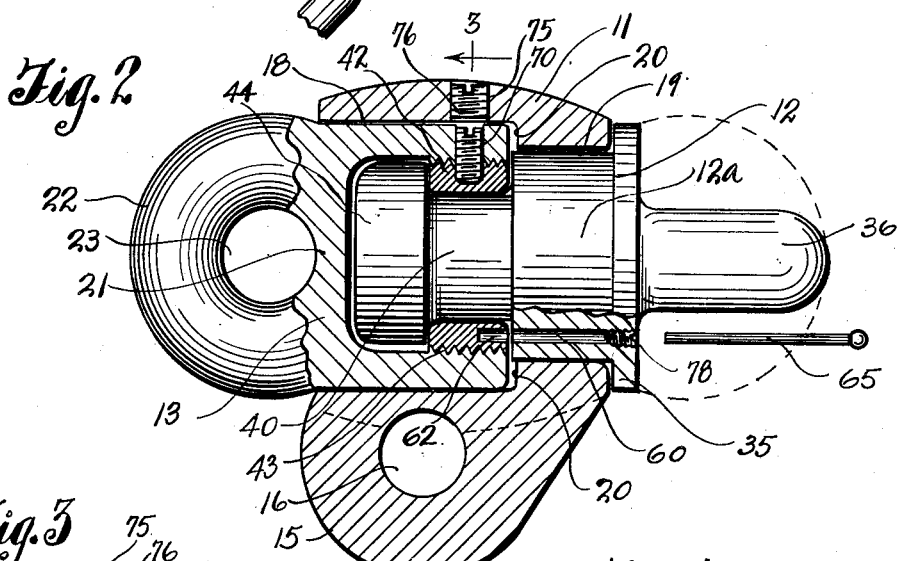
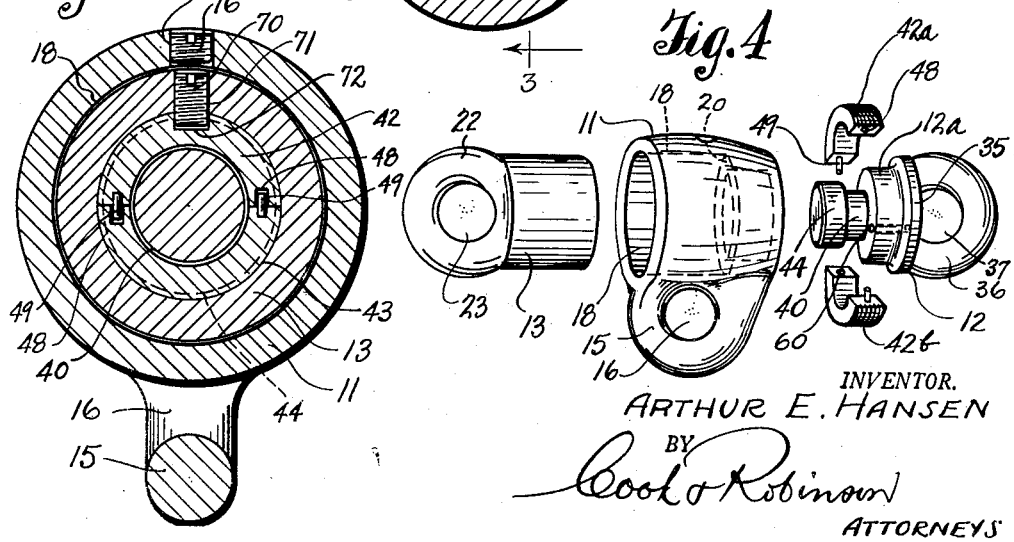
INVENTOR.
ARTHUR E. HANSEN
BY
Cook & Robinson
ATTORNEYS Patented Aug. 22, 1950

2,519,460

UNITED STATES PATENT OFFICE 2,519,460

BUTT-RIGGING SWIVEL

Arthur E. Hansen, Seattle, Wash., assignor to Young Iron Works, Seattle, Wash.

Application November 22, 1948, Serial No. 61,387

9 Claims. (Cl. 287—91)

This invention relates to swivels, and it has reference more particularly to improvements in butt-rigging swivels as used in cable logging operations, and which embody three independently rotatable elements to which various rigging elements such as cables, chains, or the like, may be operatively attached; the device being of that type generally referred to in the industry to which it pertains as a "triple swivel" and which, in its normal use in cable logging, is interposed in the main line or haul-in line for the attachment thereto of the choker assemblies.

It is the principal object of this invention to provide a triple swivel of the character above stated, embodying therein certain novel features of design and mode of assembly of parts that makes possible a substantial reduction in the over-all length of such swivels as heretofore used; that gives additional strength thereto, especially as required to withstand lateral bending strains; and also eliminates the common causes of fouling in use and various other objectionable features and disadvantages heretofore encountered in the use of such swivels in logging operations.

It is also a major object of the invention to provide a triple swivel of the character above set forth, that by reason of design and assembly of parts, possesses the advantages of strength, reduced length and non-fouling characteristics above mentioned and which can be economically manufactured and easily assembled. Furthermore, it is a swivel that can be readily disassembled for repair or replacement of parts if such should be found desirable or necessary.

More specifically stated, the objects of the present invention reside in the details of construction of the swiveling parts and in their mode of assembly and means for their securement in functional relationship, as will hereinafter be fully described.

In accomplishing the above mentioned and other objects of my invention, I have provided the improved details of construction, the preferred forms of which are illustrated in the accompanying drawings, wherein:

Fig. 1 is a side view of the present swivel, showing commonly used rigging elements as attached to its several swiveling parts.

Fig. 2 is a side view of the swivel, showing the barrel in longitudinal section and a part of the sleeve broken away to better illustrate the means for and manner of swivelly connecting the sleeve and spindle members.

Fig. 3 is a cross-section taken substantially on line 3—3 in Fig. 2.

Fig. 4 is a perspective view, showing the various parts of the device in a disassembled relationship.

Triple swivels of various kinds are now in general use in cable logging and other operations. In logging, such swivels are usually interposed in the haul-in lines or cables to which choker assemblies are attached. Sometimes in use, the swivels are pulled by the cable around stumps and are thereby subjected to excessive lateral or bending strains. Also, they become fouled and damaged under heavy pull. Therefore, it is of extreme importance in avoiding or overcoming these difficulties, that the over-all length be reduced to a minimum and that the causes of fouling be eliminated to the maximum extent.

The present device, by reason of the design of its main parts and their mode of assembly and securement one to the other, has been substantially shortened. Also, its body or barrel portion has been substantially increased in diameter in proportion to length and somewhat spherically rounded for the purpose of giving the swivel additional strength and to avoid many of the reasons for its fouling in use.

The present device comprises three independent, relatively rotatable parts, each formed with an eye member to which a chain, cable or other rigging element may be attached. It has been the purpose of this invention to so design and assemble these three parts that the swivel will withstand any stress or strain to which it may be subjected in ordinary use from any angle, and at the same time, to provide a swivel embodying parts that can be economically manufactured and readily and inexpensively assembled.

Referring more in detail to the drawings:

In Fig. 1, the device embodied by my invention is designated in its entirety by reference numeral 10. Its various parts, preferably, are constructed from strong, hard metal, such as carbon or manganese steel. It comprises three main parts, namely, the barrel or central portion 11, a spindle portion 12 and a sleeve portion 13. With reference to the showing of the swivel in Fig. 2 of the present drawings, the spindle portion 12 extends from the right-hand end of the barrel and the sleeve from the left-hand end; the barrel encloses portions of both the sleeve and spindle as noted best in Fig. 2.

The barrel portion 11 is substantially cylindrical in form, but with its outside surface somewhat spherically curved, giving the body a rounded form that will permit it to rock on any surface or object when pulled laterally thereagainst rather than to engage flatly with the object. The barrel is of greatest diameter medially of its ends and decreases in diameter toward opposite ends. The length of the barrel as here shown is less than its outside diameter, which is a departure from the usual types.

Cast integral with, or forged as a part of the barrel, at one side thereof is a loop 15, formed with an eye 16 thus providing for the attachment of a chain, cable, clevis or other rigging element 17 to the barrel; such an element being illustrated in Fig. 1 as a part of a chain, but might be a cable or clevis.

The barrel 11 is formed from end to end with an axial bore, or passage, of two stepped diameters. That portion of the passage which is of larger diameter, designated at 18, enters the barrel from the left-hand end (referring to Fig. 2) and the portion of lesser diameter, 19, enters from the opposite end. At a location between the ends of the passage, these bores of different diameters meet to provide an annular shoulder 20 as noted in Fig. 2.

Closely fitted but freely rotatably contained in the larger end portion of the passage through the barrel, is the sleeve member 13. This has a cylindrical body portion adapted to engage at its inner end flatly against the shoulder 20, thus to limit the inward movement of the sleeve in the barrel. At its outer end, the cylindrical body of the sleeve is closed by a wall 21 and is there formed with an integral eye 22 providing an opening 23, and to which eye a rigging connection such as at 24 in Fig. 1, may be made.

The spindle portion 12, with respect to its showing in Fig. 2, is applied to the barrel from its right-hand end. It is formed with an outer end portion 12a that is rotatably fitted in the barrel within the bore of smaller diameter, and this part of the spindle has an annular, projecting flange 35 formed about its outer end portion that engages against the adjacent end of the barrel to limit the movement of the spindle inwardly into the barrel. At its outer end, the spindle is provided with an eye 36 with opening 37 providing for the connection of this end of the spindle with a rigging element such as the chain 38 shown in Fig. 1.

The inner end portion of the spindle 12 is somewhat reduced in diameter and is rotatably fitted in the cylindrical body portion of the sleeve. This inner end portion also is formed with an encircling, relatively wide channel 40 in which a ring 42 is rotatably fitted; the ring, in turn, being threaded, as at 43, into the inner end of the sleeve body as shown in Fig. 2, thus to secure the spindle and sleeve together. The formation of the channel 40 in the spindle provides the ring retaining enlargement 44 at the inner end of the spindle.

It will be understood that with the parts so formed and assembled and as shown in Fig. 2, the sleeve and spindle will be secured in coaxial relationship, each rotatable relative to the other about a common axial line, and each independently rotatable in the barrel coaxially thereof. The barrel will be held against longitudinal movement relative to the spindle by reason of the spindle flange 35 which engages one end thereof and the engaging of the inner end of the sleeve with shoulder 20; the sleeve being held by ring 42.

To apply the ring 42, it is necessary that it be made in two or more segments. In Figs. 3 and 4, it is shown to be diametrically divided and to comprise two parts, 42a and 42b, adapted to be assembled end to end and each formed at its opposite end surfaces respectively with a hole 48 and pin 49 which may be interengaged to hold their assembled relationship during assembly of parts of the swivel.

To assemble the parts of the swivel, assuming that they have been provided as described, the two sections of the split ring 42 are first applied to the spindle; being assembled and seated in the spindle channel 40. Then the sleeve 13 is inserted into the barrel, within that part of the bore of larger diameter, and the spindle 12 with ring 42 applied thereto is inserted into the barrel and sleeve through that part of the bore of lesser diameter, and the ring 42 is then threaded into the sleeve, causing the parts to assume the relationship shown in Fig. 2.

To accomplish the threading of the ring into the sleeve, the spindle is formed with a bore, or passage 60, leading from its outer end into a side of the channel 40, and the ring 42 is formed in one side with a socket or hole 62 that may be brought, by relative turning of the parts, into alignment with the bore 60. A pin, such as that designated at 65 in Fig. 2, is then projected through the bore 60 into the ring socket 62, thus to form a lock whereby to hold the spindle and ring against relative rotation. While the ring is so held, the spindle then is rotated, in a manner to cause the ring to be threaded into the sleeve. When this has been accomplished, the pin 65 is withdrawn. The spindle and sleeve are thus operatively connected together and the barrel held on the swivel.

To prevent rotation and unthreading of the ring from within the sleeve, a set screw 70 is threaded through a hole 71 in the sleeve wall and seated in a socket 72 formed in the ring as shown in Fig. 3. To permit this application of the set screw, the barrel wall is formed with a radially drilled hole 75 with which the hole 71 in the sleeve may readily be aligned. The hole 75 is sufficiently large that the set screw 70 may be passed therethrough for its functional application to the sleeve and ring.

After application of the set screw 70, it is desirable that the hole 75 be closed. This is most practically accomplished by threading a plug 76 thereinto. Also, it is desirable that the hole or passage 60 be threaded at its outer end and a plug, as at 78, be applied thereto.

With the parts so assembled and secured together, there will be free and easy swiveling of all three parts 11, 12 and 13. The direct line pull is sustained by the ring 42 as applied to the sleeve and spindle. The barrel is free for relative rotation on the sleeve and spindle.

To disassemble the parts, it is only necessary to remove the set screw 70 which secures the ring, to reapply pin 65 and to unthread the ring from the sleeve. The removal of the set screw is accomplished by first removing the plug 76, then registering the set screw with the hole 75 and finally unthreading and removing the set screw through the hole 75.

If it is desired to provide for the application of a lubricant, this may be done by forming a hole through the outer end wall of the sleeve for this purpose.

It is to be noted, by reference to Fig. 1, that the causes for fouling are eliminated to great extent, and that the relatively short and spherically rounded barrel surface tends to eliminate the usual causes of bending strain on the parts. The mode of connection of the swivel and sleeve leaves the barrel free for independent swiveling action.

Having thus described my invention, what I claim as new therein and desire to secure by Letters Patent is:

1. A swivel of the character described comprising a barrel having an axial passage therethrough of stepped diameters leading to an annular shoulder within the passage, and formed with means for attachment of a rigging element thereto, a sleeve extended into said passage from one end thereof to abut said shoulder, a spindle extended into said passage from its other end and rotatably fixed in said sleeve coaxial thereof; and a flange encircling the spindle to engage that end of the barrel; said barrel, sleeve and spindle being rotatable relative to each other, and said sleeve and spindle having means at their outer ends for connecting of rigging elements thereto.

2. A swivel of the character described comprising a barrel, formed with means for the attachment of a rigging element thereto, and having an axial passage opening therethrough, a sleeve extended into the said passage from one end and rotatable therein relative to the barrel, a spindle extended into the said passage from the other end of the barrel and rotatably contained therein and in the sleeve, said spindle having an encircling channel in its inner end portion, and a ring rotatably applied to the spindle in said channel and fixed within the said sleeve to join the sleeve and spindle; said sleeve and spindle being rotatable relative to each other and to the barrel, and equipped at their outer ends for connecting the swivel in a logging line.

3. A swivel of the character described comprising a barrel formed with means for the attachment of a rigging element thereto and having an axial passage therethrough of stepped diameters leading to an annular shoulder in the passage, a sleeve contained in that portion of the passage of greater diameter, a spindle extended into the barrel through that portion of the passage of lesser diameter with its inner end portion rotatably contained in the sleeve and formed with an annular channel, a ring rotatably applied to the spindle within said channel and threaded into the inner end portion of the sleeve; said barrel, sleeve and spindle being rotatable relative to each other and said sleeve and spindle being equipped at their outer ends for connecting the swivel in a logging line.

4. A swivel of the character described comprising a barrel formed with means for attachment of a line thereto, and having an axial passage therethrough, a sleeve extended into the barrel from one end thereof, a spindle extended into the barrel from the opposite end, with its inner end portion rotatably contained in the sleeve, and having a ring-retaining enlargement at its inner end, a ring rotatably applied to the spindle and retained thereon by said enlargement and threaded into said sleeve; said sleeve and spindle being rotatable relative to each other and to the barrel, and equipped at their outer ends with means for connecting the swivel in a logging line or the like.

5. A swivel of the character described comprising a barrel formed at one side with means for the attachment of a line thereto, and having an axial passage therethrough, a sleeve extended into the passage from one end of the barrel, a spindle extended into the passage from the opposite end of the barrel and rotatably contained at its inner end in the sleeve, an enlargement on the inner end of the spindle, and a split ring rotatably applied to the spindle and retained thereon by the said enlargement, and threaded into the sleeve; said sleeve and spindle being rotatable relative to each other and to the barrel, and equipped at their outer ends with means for connecting the swivel in a logging line.

6. A swivel of the character described comprising a barrel formed at one side with means for the attachment of a line thereto and having an axial passage therethrough of stepped diameters forming an annular shoulder, a sleeve contained rotatably in one end of the passage and limited in endwise movement inwardly by said shoulder, a spindle extended into the barrel from the opposite end and rotatably contained in the sleeve and formed about its inner end with an annular channel, a split ring rotatably applied to the spindle and retained within the channel, and threaded into the sleeve, and a set screw threaded through the sleeve into holding contact with the ring; said sleeve and spindle being rotatable relative to each other and to the barrel and equipped at their outer ends with means for connecting the swivel in a line.

7. A swivel of the character described comprising a barrel having an axial passage from end to end, a sleeve rotatably applied to the passage from one end of the barrel, a spindle applied to the passage from the opposite end of the barrel and having its inner end portion rotatably contained in the sleeve and formed at that end with an encircling channel, and a split ring rotatably applied to the spindle and retained thereon within said channel and threaded into the sleeve; said spindle having a hole leading thereinto from its outer end into the channel, said ring having a hole therein opening toward the outer end of the spindle, and adapted to be aligned with the hole in said spindle for the application of a ring locking pin to said holes; the said sleeve, spindle and barrel each being equipped at their outer ends with means for the connecting of rigging elements thereto.

8. A swivel as in claim 7 including also a set screw threaded through the sleeve into holding contact with the ring, and wherein said barrel is formed with a hole adapted to be brought into alignment with the said set screw for its application or removal.

9. A swivel of the character described comprising a barrel formed with means for the attachment of a line thereto, and having an axial passage therethrough of stepped diameters forming an annular shoulder in the passage, a sleeve extended into the passage from one end of the barrel to engage said shoulder, a spindle extended into the passage from the opposite end of the barrel and rotatably contained at its inner end in the sleeve and formed at that end with an encircling channel, and formed about its outer portion with an annular flange to limit its inward movement, a split ring applied about the spindle, rotatably contained in said channel and threaded into the sleeve, and having a hole open to the outer side thereof, and a hole leading through the said flange and into said channel and adapted to be registered with the hole in the ring, to receive a locking pin; said sleeve and spindle being rotatable relative to each other and to the barrel, and equipped at their outer ends for their connection with ends of lines.

ARTHUR E. HANSEN.

REFERENCES CITED

The following references are of record in the file of this patent:

UNITED STATES PATENTS

| Number | Name | Date |
| --- | --- | --- |
| 917,349 | Opsal | Apr. 6, 1909 |
| 1,655,536 | Dumm | Jan. 10, 1928 |
| 2,246,588 | Harrall | June 24, 1941 |
| 2,384,490 | Plum et al. | Sept. 11, 1945 |
| 2,429,929 | Fisher | Oct. 28, 1947 |